United States Patent
Kozlov et al.

(10) Patent No.: US 8,724,952 B2
(45) Date of Patent: May 13, 2014

(54) POLARIZATION-MAINTAINING OPTICAL FIBER WITH PURE SILICA CORE

(75) Inventors: Valery A Kozlov, Painted Post, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 480 days.

(21) Appl. No.: 13/097,222

(22) Filed: Apr. 29, 2011

(65) Prior Publication Data
US 2012/0275750 A1    Nov. 1, 2012

(51) Int. Cl.
*G02B 6/024* (2006.01)
*G02B 6/032* (2006.01)

(52) U.S. Cl.
CPC ............... *G02B 6/024* (2013.01); *G02B 6/032* (2013.01)
USPC ........................... 385/125; 385/123; 385/127

(58) Field of Classification Search
CPC ........................................................ G02B 6/024
See application file for complete search history.

(56) References Cited

U.S. PATENT DOCUMENTS

| 7,289,709 | B2* | 10/2007 | Folkenberg et al. | 385/126 |
|---|---|---|---|---|
| 7,382,957 | B2* | 6/2008 | Chen et al. | 385/123 |
| 7,412,142 | B2 | 8/2008 | Chen et al. | 385/125 |
| 7,450,806 | B2 | 11/2008 | Bookbinder et al. | 385/125 |
| 7,697,809 | B2 | 4/2010 | Bookbinder et al. | 385/125 |
| 8,000,575 | B2* | 8/2011 | Chen et al. | 385/123 |
| 2012/0123702 | A1* | 5/2012 | Chen et al. | 702/42 |
| 2013/0071082 | A1* | 3/2013 | Gagnon et al. | 385/124 |

* cited by examiner

*Primary Examiner* — Michelle R Connelly
(74) *Attorney, Agent, or Firm* — Svetlana Short

(57) ABSTRACT

A polarization-maintaining (PM) optical fiber has a pure silica core surrounded by a cladding having a region with randomly arranged voids. Stress members are arranged in the cladding on opposite sides of and in line with the core, and impart birefringence to the PM optical fiber. The PM optical fiber is resistant to aging effects and has a broad single-mode spectral range of 400 nm to 1,600 nm.

20 Claims, 4 Drawing Sheets

_US 8,724,952 B2_

POLARIZATION-MAINTAINING OPTICAL FIBER WITH PURE SILICA CORE

FIELD

The disclosure generally relates to polarization-maintaining optical fibers, and in particular relates to polarization-maintaining optical fibers having a pure silica core.

BACKGROUND

Polarization-maintaining (PM) optical fibers are configured to preserve the polarization direction of the guided light as it travels down the fiber. PM optical fibers are used in certain types of applications that use polarized light, such as optical-fiber-based interferometers, optical fiber sensors, optical fiber gyroscopes, high-power optical fiber lasers, some types of quantum key distribution systems, and for the light-modulating sections of optical telecommunication systems.

There are a number of different geometries for PM optical fibers that create the fiber's PM capability. An example PM optical fiber comprises a central $GeO_2$-doped core along with two stress-applying members in the cladding that create birefringence, resulting in an optical fiber with excellent PM properties. Examples of such a PM optical fiber are disclosed in U.S. Pat. No. 7,697,809, which is incorporated by reference herein. Other example PM optical fibers are disclosed in U.S. Pat. No. 7,412,142, which is incorporated by reference herein.

However, present-day PM optical fibers have two main shortcomings. The first is that doped-core PM optical fibers are relatively sensitive to aging effects as compared to a pure silica core. The second is that they operate over a relatively limited spectral band.

SUMMARY

An embodiment of the disclosure is a PM optical fiber that includes a core region (core) consisting of pure silica. An inner cladding region immediately surrounds the core and has randomly arranged voids. An outer cladding region immediately surrounds the inner cladding region. The outer cladding region is substantially free of randomly arranged voids. First and second stress members reside at least partially within the outer cladding region, i.e., they may extend into the inner cladding region. The first and second stress members are disposed on opposite sides of and in line with the core region and are configured to impart birefringence to the PM optical fiber.

Another embodiment of the disclosure is a PM optical fiber that includes a core region consisting of pure silica, and a cladding region surrounding the core region. The cladding region includes randomly arranged voids immediately adjacent the core region. The PM optical fiber also includes first and second stress members arranged on opposite sides of and in line with the core region and residing within the cladding region. The first and second stress members include a doped material that creates a difference in the coefficient of thermal expansion between the stress members and the surrounding cladding region, thereby forming stress birefringence in the PM optical fiber.

An additional embodiment of the disclosure is a method of forming a PM optical fiber. The method includes preparing a fiber preform. The fiber preform has a preform core region consisting of pure silica. The fiber preform also has a preform inner cladding region immediately surrounding the preform core region. The preform inner cladding region includes randomly arranged voids. A preform outer cladding region immediately surrounds the preform inner cladding region and is substantially free of randomly arranged voids. The method also includes adding to the fiber preform first and second preform doped material in first and second holes formed in and that reside at least partially within the preform outer cladding. The holes are disposed on opposite sides of and in line with the preform core region. The method further includes drawing the fiber preform to form the PM optical fiber.

Additional features and advantages are set forth in the detailed description that follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings and claims are included to provide a further understanding of the disclosure, and are incorporated into and constitute a part of this specification. The drawings illustrate various embodiments and together with the description serve to explain the principles and operation. The claims are incorporated into and constitute part of this specification.

Cartesian coordinates are provided in some of the Figures by way of reference.

DETAILED DESCRIPTION

Reference is now made in detail to the embodiments of the disclosure, examples of which are illustrated in the accompanying drawings. Whenever possible, like reference numbers are used to refer to like components or parts. Cartesian coordinates are shown in some of the Figures by way of reference.

In the discussion below, the following definitions and terminology as commonly used in the art are employed:

Refractive index profile: the refractive index profile is the relationship between the relative refractive index percent (Δ %) and the optical fiber radius r (as measured from the centerline of the optical fiber) over a selected segment of the fiber.

Relative refractive index percent Δ %: the term Δ % represents a relative measure of refractive index defined by the equation: $\Delta \% = 100 \times (n_i^2 - n_c^2)/2n_i^2$, where $n_i$ is the maximum refractive index of the index profile segment denoted as i, and $n_c$ is the reference refractive index. Every point in the segment has an associated relative refractive index measured relative to the reference refractive index.

Pure silica: undoped silica, $SiO_2$.

Birefringence: Birefringence is the difference between the two effective refractive indices associated with two polarization modes (directions).

Figure 1:
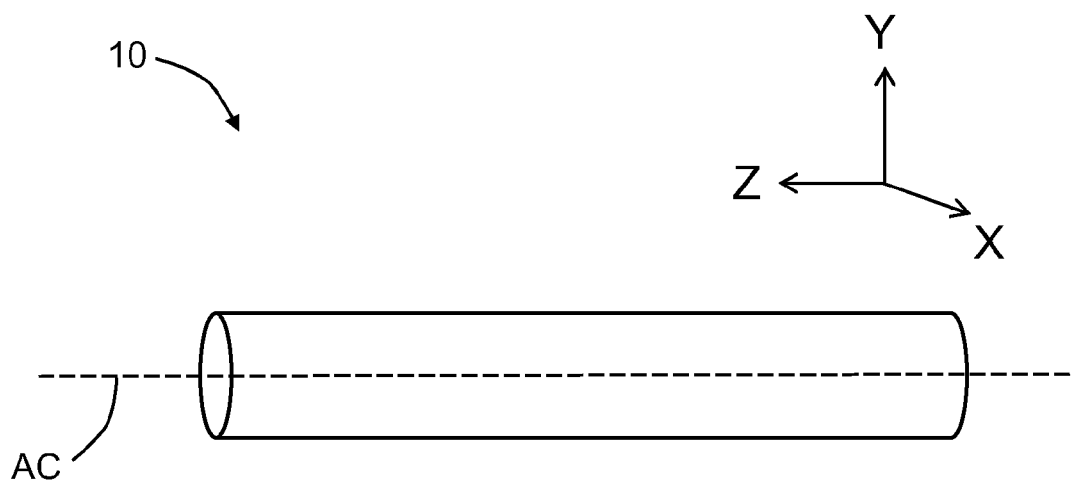
FIG. 1 is a side view of an example PM optical fiber according to the disclosure.
Figure 2:
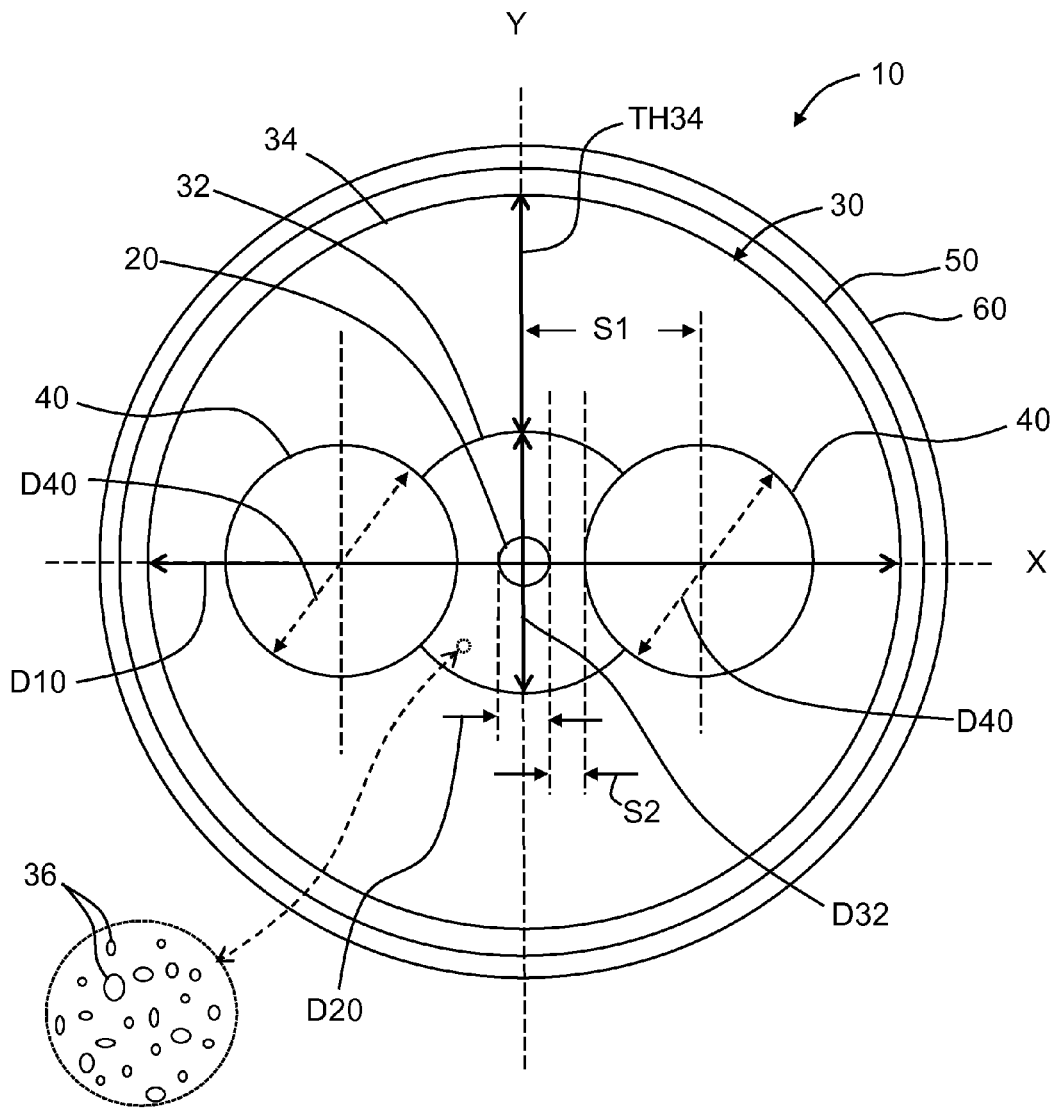
FIG. 2 is an X-Y cross-sectional view of an example PM optical fiber of FIG. 1.

FIG. 1 is a side view of a section of PM optical fiber 10 according to the present disclosure, and FIG. 2 is an X-Y cross-sectional view of the PM optical fiber of FIG. 1. PM optical fiber 10 has a diameter D10 and a central axis or centerline AC PM optical fiber 10 includes a core region ("core") 20 centered on centerline AC. Core 20 has a diameter D20. In one example, core diameter D20 is between 5 microns and 10 microns, while in another example is between 7 microns and 9 microns. In an example, core 20 consists of pure silica. Also in an example, core 20 has a round cross-sectional shape, though other shapes such as elliptical may be employed.

Core 20 is surrounded by a cladding region ("cladding") 30 that in an example includes an annular inner cladding region or portion 32 having an outer diameter D32 and that immediately surrounds core 20. Cladding 30 also includes an annular outer cladding region or portion 34 that immediately surrounds the inner cladding region 32 and that has an outer diameter D10 (i.e., in one example defines the PM optical fiber diameter), as well as an annular thickness TH34. Inner cladding region 32 includes random voids 36, which are also referred to as "random airlines" (see inset, FIG. 2). Random voids 36 are typically elongate and run generally parallel to centerline AC, and can be filled with air, or other gases such as N, $O_2$, $CO_2$, $Kr_2$, $SO_2$, etc. An example process for making random voids 36 is disclosed in U.S. Pat. No. 7,450,806, entitled "Microstructured optical fibers and methods," which patent is incorporated by reference herein. Outer cladding region 34 is substantially free of random voids 36.

In an example, the distribution of random voids 36 is characterized by a Gaussian distribution with an average void diameter and a standard deviation $\sigma$. In an example, the void average diameter is calculated or determined based on taking various cross-sections of PM optical fiber 10 and is in the range of 100 nm to 500 nm, while $\sigma$ is between 100 nm and 300 nm. In one example, the void fraction (i.e., the ratio of the area represented by voids 36 as compared to the area represented by solid material for a given cross-section) is in the range of 0.5% and 4%, while in another example is in the range of 0.8% and 2%.

Note that because inner cladding region 32 comprises randomly arranged voids 36, the boundary between the inner cladding region and outer cladding region 34 is not necessarily sharp, i.e., the diameter D32 of inner cladding region can vary. Also in an example, cladding 30 comprises only inner cladding portion 32, i.e., the thickness TH34 of outer cladding region 34 goes to zero, in which case the inner cladding region defines diameter D10. An example material for cladding 30 is silica.

PM optical fiber 10 also includes first and second stress-applying members ("stress members") 40 that reside within cladding 30. Stress members 40 have a diameter D40 and are arranged on opposite sides of core 20, and lie along a line that includes central axis AC. In FIG. 2, stress members 40 are shown as lying along the X-axis. Stress members 40 have a center-to-center spacing S1 from core 20 (i.e., from central axis AC) and an edge-to-edge spacing S2 from the core. In an example, stress members 40 extend the entire length of PM optical fiber 10 and have a substantially constant diameter D40 along their length.

In an example, stress members 40 are formed by doping pure silica with Boron (B), as described below. A typical value for $\Delta$ % for B-doped stress members relative to a pure silica cladding 30 is 0.6% to 1%, with the stress-member refractive index being lower than that of pure silica.

In an example, at least a portion of stress members 40 reside in inner cladding region 32, as illustrated in FIG. 2. In other embodiments, stress members 40 reside entirely within outer cladding region 34. In an example, stress members 40 serve to impart birefringence to core 20 and cladding 30 and define a slow axis in line with the line connecting the stress members and the core.

PM optical fiber 10 also optionally includes an inner coating 50 that immediately surrounds cladding 30 and an outer coating 60 that immediately surrounds inner coating 50. Inner and outer coatings 50 and 60 generally serve a protective function and in example are formed from one or more acrylate-based coating materials.

PM optical fiber 10 supports a relatively broad single-mode spectral range $\Delta\lambda$, which in an example extends from 400 nm to 1,600 nm.

In example embodiments, PM optical fiber 10 has a relative refractive index percent $\Delta$ % of between 0.1% to 0.5%.

Table 1 below includes example parameters values associated with PM optical fiber 10.

TABLE 1

Example parameter values for PM optical fiber 10

| Parameter | Example values (nominal) |
|---|---|
| D10 | 125 microns |
|  | Example range: 40-250 microns |
| D20 | 5 to 10 microns; 7 to 9 microns |
| D32 | 20 to 50 microns |
| D40 | 15 to 30 microns |
| S1 | 15 to 30 microns |
| S2 | 2 to 15 microns |
| $\Delta$% | 0.1% to 0.5% |

Forming the PM Optical Fiber

Figure 3:
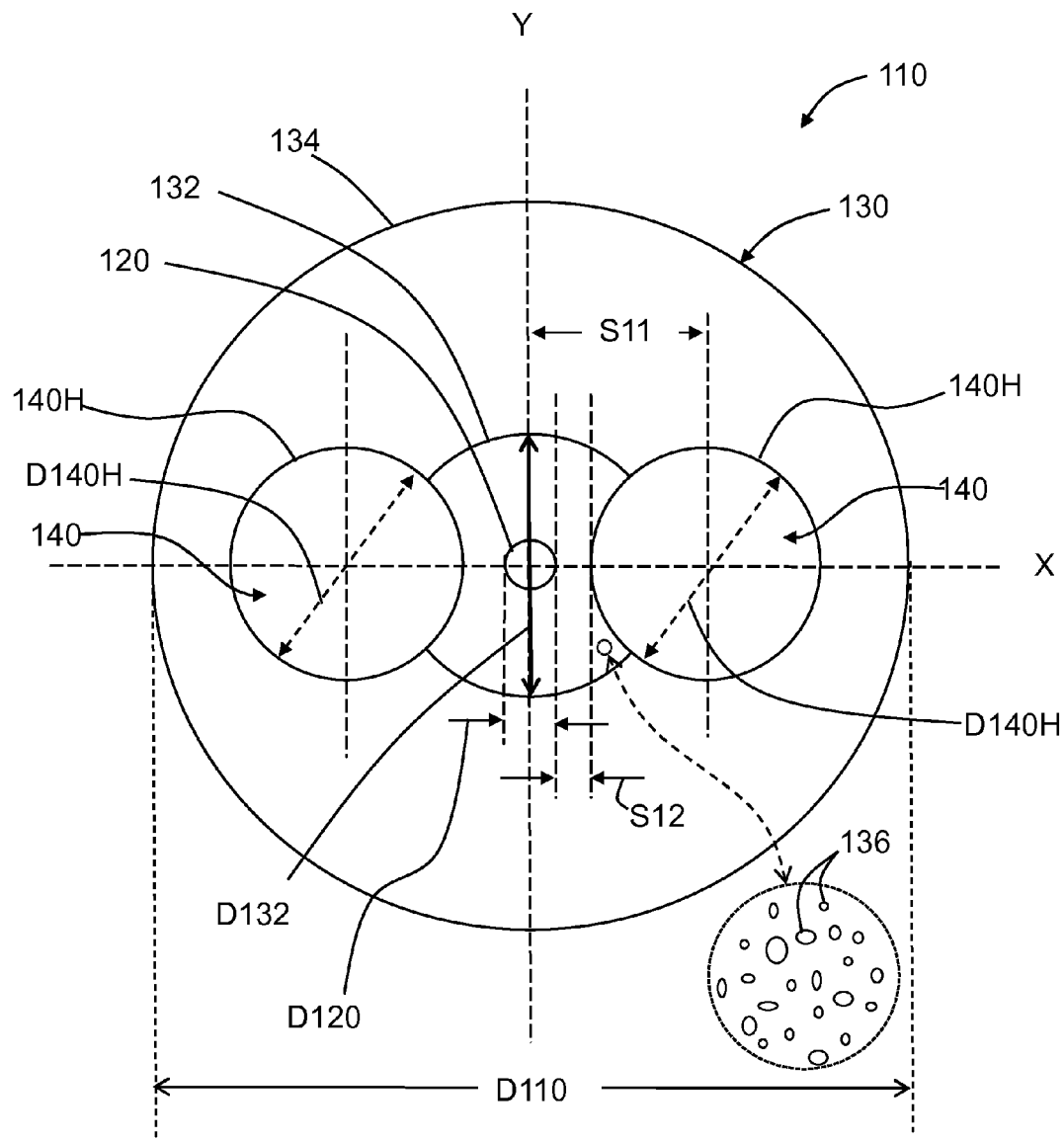
FIG. 3 is an X-Y cross-sectional view of an example PM fiber preform used to create the PM optical fiber.

PM optical fiber 10 is formed by drawing a PM fiber preform or blank. FIG. 3 is similar to FIG. 2 and illustrates an example PM fiber preform ("fiber preform") 110 used to form PM optical fiber 10. Fiber preform 110 has a configuration that corresponds to PM optical fiber 10, and includes a pure silica preform core 120, and a preform cladding 130 that has an inner preform cladding region 132 and an outer preform cladding region 134 that surrounds the inner preform cladding region. In an example, preform cladding 130 comprises silica, with inner preform cladding region 132 containing randomly arranged voids 136 configured so that when PM optical fiber 10 is drawn, the voids have the desired size, shape and distribution characteristics.

Fiber preform 110 includes holes D140H that are formed (e.g., drilled) into preform cladding 130, with the hole locations corresponding to the locations of stress members 40 in PM optical fiber 10. Holes D140H have a center-to-center spacing from preform core 120 of S11 and an edge-to-edge spacing of S12.

Holes D140H are subsequently filled with a material 140, which in an example is the same as the cladding material (e.g., silica) but further includes at least one dopant that creates a different coefficient of thermal expansion (CTE) from that of the surrounding cladding material. An example dopant includes boron (B), e.g., $B_2O_3$, with a dopant concentration of 20 wt % to 25 wt %.

Table 2 below illustrates example parameter values for fiber preform 110.

TABLE 2

Example parameter values for fiber preform 110

| Parameter | Example values (nominal) |
|---|---|
| D110 | 45 mm |
| D120 | 3 mm |
| D132 | 14.5 mm |
| D140H | 13.9 mm |
| S11 | 11 mm +/− 0.2 mm |
| S12 | 2.55 mm |

Figure 4:
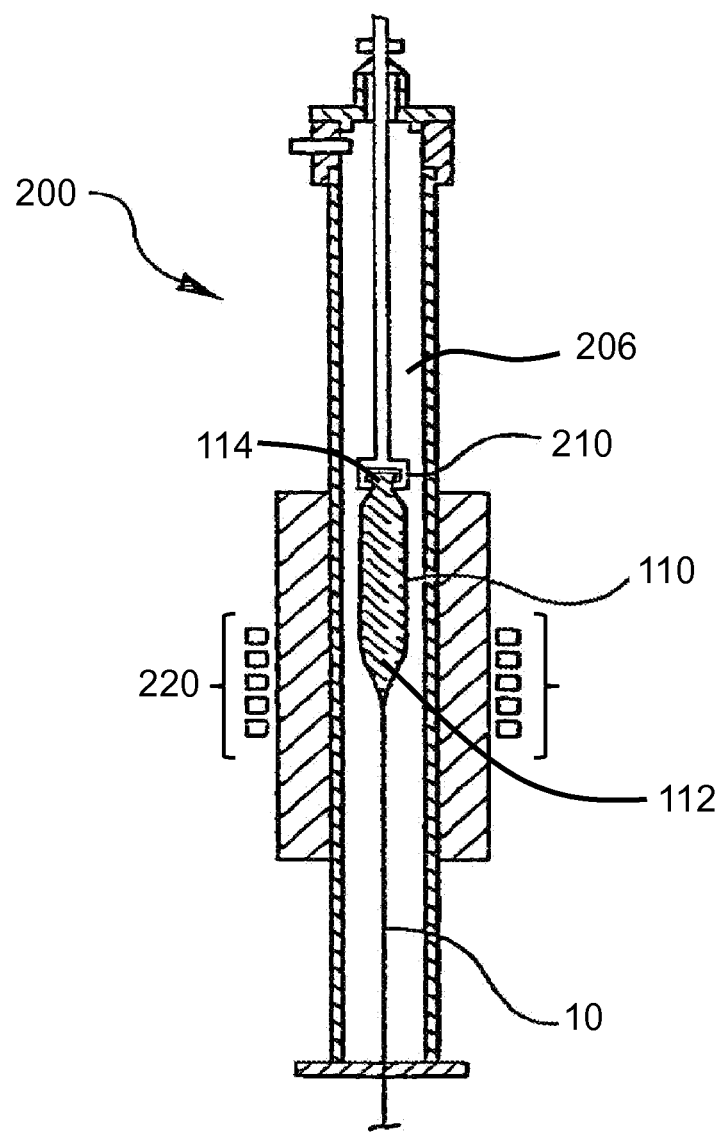
FIG. 4 is a schematic diagram of a draw tower showing the PM fiber preform being drawn into the PM optical fiber disclosed herein.

FIG. 4 is a schematic diagram of an example draw tower 200 used to draw PM optical fiber 10 from fiber preform 110. Fiber preform 110 has proximal and distal ends 112 and 114, and is operably supported within draw tower interior 206 at its distal end by a support member ("handle") 210. Heat is then applied to fiber preform 110 at proximal end 112 via heating elements 220. PM optical fiber 10 is then drawn from fiber preform 110 using conventional fiber drawing procedures. Material 140 in holes D140H becomes stress members 40 that, because of the different CTE of the surrounding cladding 30, are put into a state of tension or compression. This in turn generates the aforementioned birefringence that gives PM optical fiber 10 its PM capability.

Once PM optical fiber 10 is drawn, inner and outer coatings 50 and 60 may optionally be added to protect the PM optical fiber.

The PM optical fiber 10 formed as described above and having the above-described configuration is generally less sensitive to adverse aging effects related to, for example, exposure to radiation and hydrogen than its counterparts that use doped silica cores.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present disclosure without departing from the spirit and scope of the same. Thus, it is intended that the present disclosure cover the modifications and variations of this disclosure provided they come within the scope of the appended claims and their equivalents.

We claim:

1. A polarization-maintaining (PM) optical fiber, comprising:
    a core region consisting of pure silica;
    a cladding region surrounding the core region and having randomly arranged voids immediately adjacent the core region; and
    first and second stress members arranged on opposite sides of and in line with the core region and residing within the cladding region, the first and second stress members configured with a doped material to impart a birefringence to the PM optical fiber.

2. The PM optical fiber of claim 1, further comprising the cladding region having an outer annular portion that includes substantially no voids.

3. The PM optical fiber of claim 1, further comprising the first and second stress members comprising $B_2O_3$ and $SiO_2$.

4. The PM optical fiber of claim 1, further comprising at least one of:

a) the randomly arranged voids having a void fraction in the range from 0.5% to 4%;
    b) a single-mode spectral range from 400 nm to 1600 nm;
    c) the randomly arranged voids having an average diameter in the range from 100 nm to 500 nm; and
    d) the core region having a core diameter between 5 microns and 10 microns.

5. A polarization-maintaining (PM) optical fiber, comprising:
    a core region consisting of pure silica;
    an inner annular cladding region immediately surrounding the core region, the inner annular cladding region including randomly arranged voids;
    an outer annular cladding region immediately surrounding the inner annular cladding region, the outer annular cladding region being substantially free from randomly arranged voids; and
    first and second stress rods that reside at least partially within the outer annular cladding region, the first and second stress rods being disposed on opposite sides of and in line with the core region and configured to impart birefringence into the PM optical fiber.

6. The PM optical fiber according to claim 5, further comprising the first and second stress rods at least partially residing within the inner cladding region.

7. The PM optical fiber according to claim 5, further comprising the first and second stress rods comprising $B_2O_3$ and $SiO_2$.

8. The PM optical fiber according to claim 5, further comprising the inner and outer cladding regions each comprising silica.

9. The PM optical fiber according to claim 5, further comprising the core region having a core diameter between 5 microns and 10 microns.

10. The PM optical fiber according to claim 9, further comprising the core region having a core diameter between 7 microns and 9 microns.

11. The PM optical fiber according to claim 5, further comprising the randomly arranged voids having an average diameter in the range from 100 nm to 500 nm.

12. The PM optical fiber according to claim 5, further comprising the randomly arranged voids having a void fraction in the range from 0.5% to 4%.

13. The PM optical fiber according to claim 5, further comprising a single-mode spectral range from 400 nm to 1600 nm.

14. A method of forming a polarization-maintaining (PM) optical fiber, comprising:
    preparing a fiber preform having preform core region consisting of pure silica, a preform inner cladding region immediately surrounding the preform core region, the preform inner cladding region including randomly arranged voids, and a preform outer cladding region immediately surrounding the preform inner cladding region, the preform outer cladding region being substantially free from randomly arranged voids;
    adding to the fiber preform first and second preform doped material in first and second holes that reside at least partially within the preform outer cladding, the holes being diametrically disposed and in line with the preform core region; and
    drawing the fiber preform to form the PM optical fiber.

15. The method of claim 14, further comprising forming the doped material using a boron doping process in silica.

16. The method according to claim 14, further comprising arranging the first and second holes to at least partially reside within the preform inner cladding region.

17. The method according to claim 14, further comprising forming each of the inner and outer preform cladding regions to include silica.

18. The method according to claim 14, further comprising forming the PM fiber preform to have at least one of the following properties:
   a) a fiber preform diameter of 45 mm;
   b) a preform core region diameter of 3 mm,
   c) diameters of the first and second preform stress rods of 3 mm;
   d) a spacing between the preform core and the first and second preform stress rods of 2.55 mm; and
   e) a preform inner cladding diameter of 14.5 mm.

19. The method according to claim 14, further comprising drawing the preform so that the PM optical fiber has a diameter of nominally 125 microns or nominally 250 microns.

20. The method according to claim 14, further comprising drawing the preform into a single-mode PM-maintaining optical fiber having a single-mode spectral range from 400 nm to 1600 nm.

* * * * *